United States Patent
Sanoner et al.

(10) Patent No.: US 7,263,031 B2
(45) Date of Patent: Aug. 28, 2007

(54) DISTANCE MEASURING DEVICE FOR ACOUSTICALLY MEASURING DISTANCE

(75) Inventors: Hughes Sanoner, Hong Kong (CN); Desmond Wai Nang Tse, Hong Kong (CN); Ronald Tak Yan Yim, Hong Kong (CN)

(73) Assignee: Solar Wide Industrial Limited, Tsuen Wan, New Territories (HK)

( * ) Notice: Subject to any disclaimer, the term of this patent is extended or adjusted under 35 U.S.C. 154(b) by 81 days.

(21) Appl. No.: 11/262,968

(22) Filed: Nov. 1, 2005

(65) Prior Publication Data

US 2007/0097790 A1    May 3, 2007

(51) Int. Cl.
*G01S 15/08* (2006.01)
(52) U.S. Cl. .......................... 367/99; 367/902; 73/649; 73/629
(58) Field of Classification Search ................. 367/99, 367/902; 73/627, 631, 629, 632, 649, 290 V
See application file for complete search history.

(56) References Cited

U.S. PATENT DOCUMENTS

| | | | |
|---|---|---|---|
| 4,581,726 A | | 4/1986 | Makino et al. |
| 4,608,674 A | * | 8/1986 | Guscott ........................ 367/93 |
| 4,719,605 A | * | 1/1988 | Eder et al. .................... 367/99 |
| 4,910,717 A | | 3/1990 | Terry |
| 5,442,592 A | | 8/1995 | Toda et al. |
| 6,304,179 B1 | * | 10/2001 | Lotito et al. .................. 367/99 |

* cited by examiner

*Primary Examiner*—Ian J. Lobo
(74) *Attorney, Agent, or Firm*—Leydig, Voit & Mayer, Ltd.

(57) ABSTRACT

A distance measuring device includes a transmitter for transmitting an acoustic signal at a distant object, an acoustic signal receiver for receiving a reflected acoustic signal reflected from the distant object, a temperature sensor detecting air temperature, a humidity sensor detecting air humidity, an amplifier amplifying the reflected acoustic signal, a comparator coupled to the amplifier comparing the amplified reflected acoustic signal with a reference and generating a comparator output when the level of the amplified reflected acoustic signal exceeds the reference, a gain controller increasing the gain from transmitting an acoustic signal until the comparator output is generated, a threshold generator providing the reference to the comparator and decreasing the reference at an exponential rate from transmitting the acoustic signal until the comparator output is generated, and a controller determining use of only the air temperature, velocity of the acoustic signal, and distance traveled from transmitting the acoustic signal until the comparator output is generated.

3 Claims, 6 Drawing Sheets

DISTANCE MEASURING DEVICE FOR ACOUSTICALLY MEASURING DISTANCE

BACKGROUND OF THE INVENTION

1. Field of the Invention

The present invention relates to a device and method for measuring distance using acoustic waves.

2. Description of the Prior Art

It is known in the art to determine the distance between a location and an object from the time (t) taken for an acoustic wave generated at the location to be reflected from the object and return to the location. If the velocity (v) of the acoustic wave is known then the distance (s) from the location to the object can be calculated using the equation s=v×t. This equation is idealistic. In practice, propagation of the acoustic wave is effected by temperature and humidity of the air through which it travels. Typically a 10 degrees Celsius (degC) change in temperature results in 2 percent change in velocity which translates into a 2 percent error in distance measurement. Therefore, there is a need to compensate the affects of temperature and humidity.

A device for determining distance using sound waves is described in U.S. Pat. No. 4,464,738, but the device ignores the effects of temperature and humidity on acoustic wave propagation.

U.S. Pat. No. 4,581,726 discloses an ultrasonic distance measuring device that compensates for variation of propagation characteristic of the ultrasonic wave. However, it compensates for the effect of temperature and humidity on the attenuation of wave propagation in the air and not the temperature dependency of sound velocity, which also significantly affects the accuracy of distance measurement.

U.S. Pat. No. 4,910,717 discloses a distance measuring device in which a charging circuit for a timing capacitor has two temperature dependent diodes. The diodes compensate for the effect of temperature on velocity of the sound wave. However, there would be difficulty in selecting and matching diodes with suitable accuracy. Furthermore, temperature change may not be as simple as a step change, and complicated temperature changes may give an imprecise result of temperature estimation.

U.S. Pat. No. 5,442,592 discloses a distance meter that cancels out the effects of temperature and humidity variations by including a measuring unit and a reference unit having a known distance. However, a practical actualization of the idea in measuring a physical distance up to 20 meters with a portable device is virtually infeasible.

SUMMARY OF THE INVENTION

It is an object of the invention to provide a device and method of calculating, in an acoustic measurement device, a distance to an object which compensates for the effect of temperature and humidity, or which at least provides the public with a useful alternative.

There is disclosed herein a distance measuring device comprising:
an acoustic signal transmitter for transmitting an acoustic signal at a distant object,
an acoustic signal receiver for receiving a reflected acoustic signal reflected from the distant object,
a temperature sensor for detecting air temperature,
a humidity sensor for detecting air humidity,
an amplifier coupled to the receiver for amplifying the reflected acoustic signal,
a comparator coupled to the amplifier for comparing a level of the amplified reflected acoustic signal with a reference level and generating a comparator output when the level of the amplified reflected acoustic signal exceeds the reference level,
a gain controller for providing a gain to the amplifier and increasing the gain from a time of transmitting an acoustic signal at a distant object until the comparator output is generated,
a threshold generator for providing the reference level to the comparator based on both the detected air temperature and the detected air humidity and decreasing the reference level at an exponential rate of decrease from the time of transmitting the acoustic signal until the comparator output is generated, and
a controller for determining using only the detected air temperature a velocity of the acoustic signal and the distance travelled from the time of transmitting the acoustic signal until the comparator output is generated.

Preferably, the gain controller comprises a plurality of independently switchable resistors connected in parallel and a capacitor connected in series with the resistors.

Preferably, the threshold generator comprises a current source, a plurality of independently switchable resistors and a capacitor connected in parallel.

There is also disclosed herein a method of acoustically obtaining a distance to an object comprising steps of:
transmitting through air an acoustic signal towards an object,
receiving a reflected acoustic signal reflected from the object,
determining whether the reflected acoustic signal is a valid reflected signal and generating a received signal,
determining a time from transmitting the acoustic signal until the received signal is generated,
determining a temperature of the air and using the temperature to determine a velocity of the acoustic signal, and
calculating a distance to the object using the time and the velocity.

Preferably, the method further includes repeating the steps to calculate a second distance to the object, and if the second distance is the same as the distance communicating the distance to a user.

Preferably, the velocity is determined using the equation:

$$\text{velocity} = 331.45 \times \text{Sqr}((\text{temperature}+273.16)/273.16).$$

Preferably, the method further includes, in response to user input, continuously repeating the steps to calculate a new distance to the object and communicating the new distance to a user.

Preferably, determining whether the reflected acoustic signal is a valid reflected acoustic signal comprises providing an amplifier having a gain for amplifying the reflected acoustic signal.

Preferably, the method further includes, increasing the gain during the time from transmitting the acoustic signal until the received signal is generated.

Preferably, determining whether the reflected acoustic signal is a valid reflected signal comprises amplifying the reflected signal, comparing a level of the amplified signal to a reference level and generating the received signal when the level of the amplified signal exceeds the reference level.

Preferably, the method further includes, determining a humidity of the air and using the temperature and the humidity to determine an initial value of the reference level and decreasing the reference level at an exponential rate of decrease from the time of transmitting the acoustic signal until the received signal is generated.

Further aspects of the invention will become apparent from the following description and drawings, which are given by way of example only to illustrate the invention.

BRIEF DESCRIPTION OF THE DRAWINGS

Embodiments of the invention will now be described with reference to the accompanying drawings in which.

DESCRIPTION OF THE PREFERRED EXAMPLES

Figure 1:
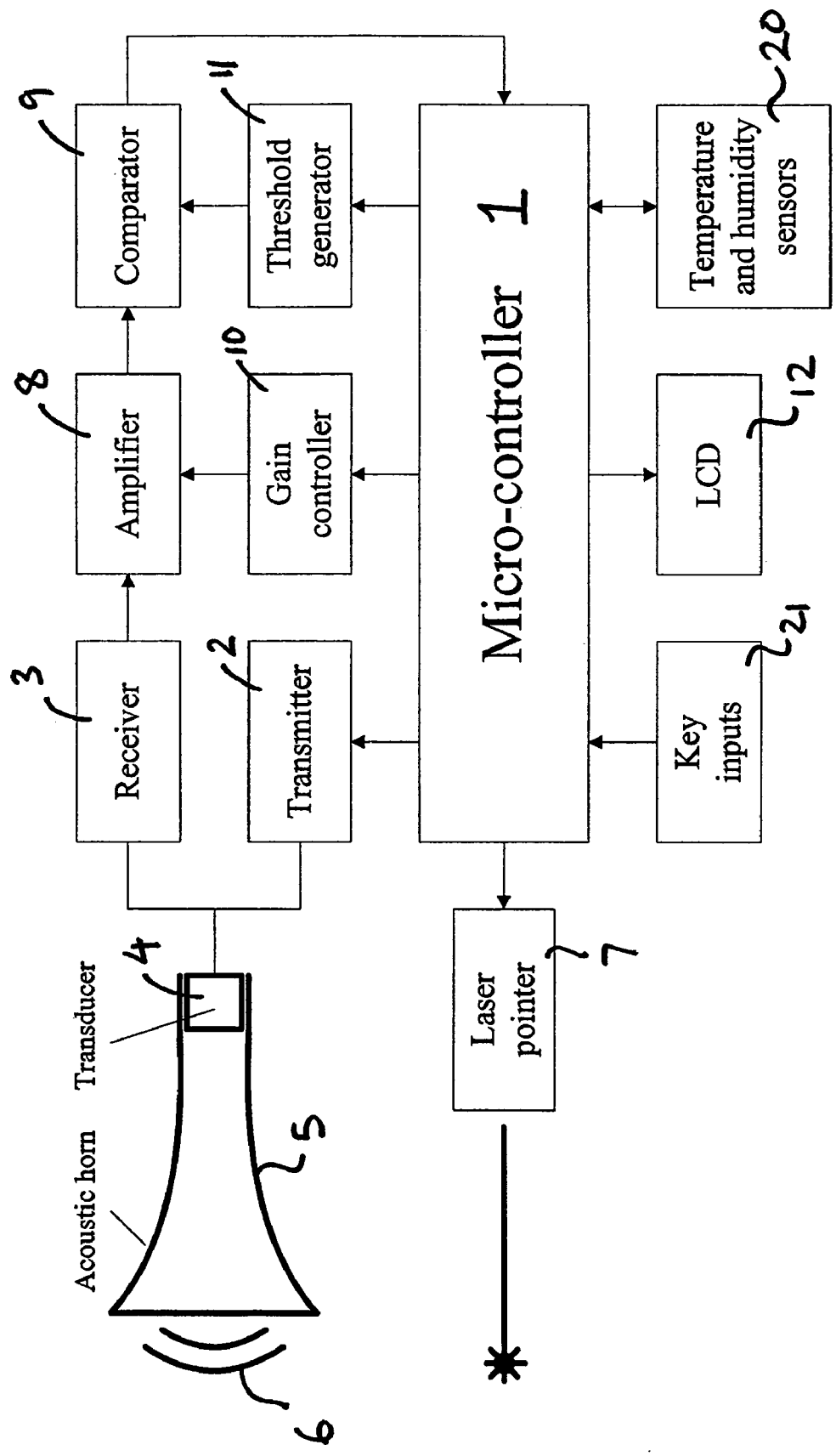
FIG. 1 is a schematic illustration of an ultrasonic distance measuring device according to the invention.

FIG. 1 is a schematic illustration of an ultrasonic distance measuring device according to the invention. The device comprises a transmitter 2 and receiver 3 coupled to a transducer 4 and acoustic horn 5 for transmitting an acoustic wave 6 at a distant object (not shown) and receiving a reflected acoustic wave. The transmitted acoustic wave 6 is reflected off the distant object and received back at the transducer 4. A microcontroller 1 controls the transmitter 2 and a laser pointer 7 is provided to help accurately direct the device at the distant object. The reflected acoustic wave is detected by transducer 4 and receiver 3 and amplified by an amplifier 8. The amplified signal is compared to a threshold value by a comparator 9. The comparator output signal is returned to the microcontroller 1 for calculation of a distance measurement. The distance measurement is output to a LCD display 12.

The gain of amplifier 8 is controlled by a gain controller 10 coupled to microcontroller 1, and the threshold value input to comparator 9 is determined by a threshold generator 11 also coupled to microcontroller 1. Key inputs 21 to the microcontroller 1 include a button permitting a user to trigger a distance measurement after pointing the device at an object.

The acoustic wave 6 diverges as it moves away from the transducer 4. The acoustic horn 5 helps reduce divergence and focuses the acoustic wave to increase the power of transmission along the central axis. However, there is still some divergence of the transmitted and reflected waves which results in unwanted sideways reflections being received by the transducer 4. The amount of divergence increases the further the wave travels and so the sideways reflections received by the transducer 4 also increase the further the wave travels to the object and back.

In order to compensate for the greater divergence of the wave with increased distance the gain of the amplifier 8 is increased with time.

Figure 2:
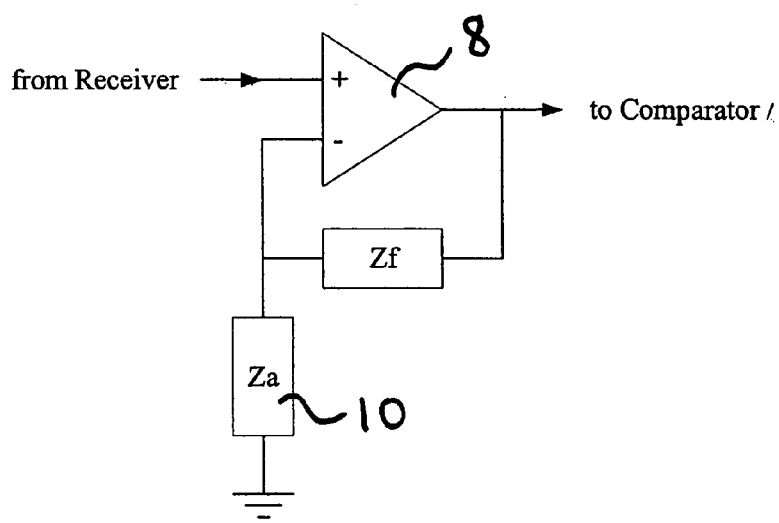
FIG. 2 is a schematic illustration of the amplifier and gain controller of FIG. 1.

FIG. 2 illustrates the arrangement of amplifier 8 and gain controller 10. The amplifier gain is 1+Zf/Za. The gain is varied by altering the impedance value Za of the gain controller 10.

Figure 3:
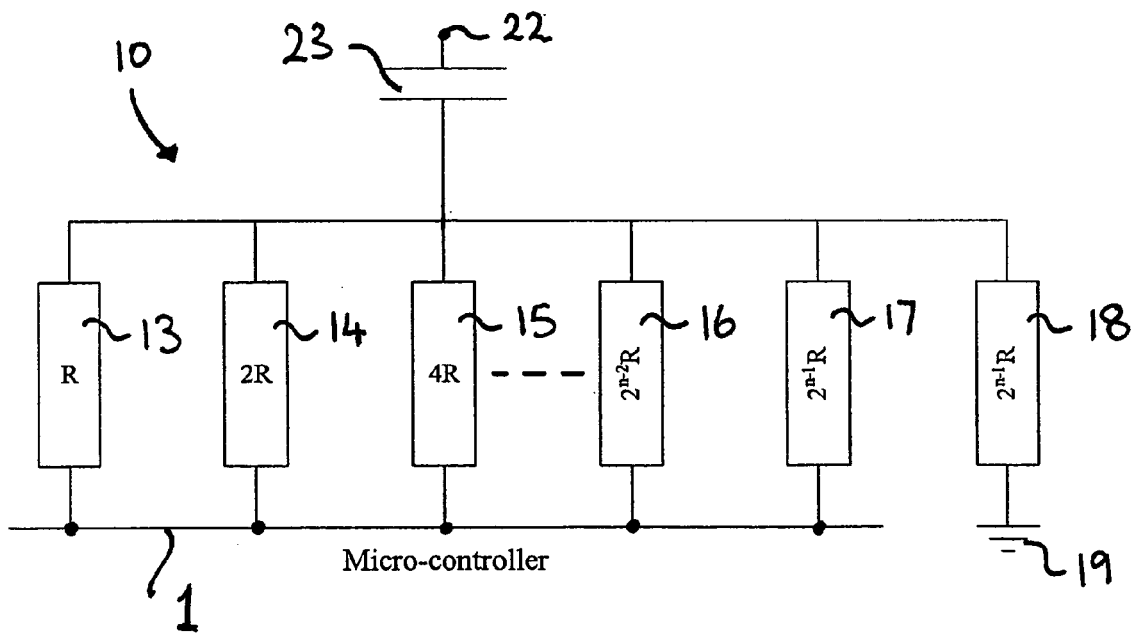
FIG. 3 illustrates the arrangement of the gain controller of FIGS. 1 and 2.

FIG. 3 illustrates the digital-to-analog resistor network of gain controller 10. This network comprises a plurality of parallel connected resistors 13, 14, 15, 16 and 17 with one lead of each resistor connected to a terminal of the microcontroller 1. One resistor 18 in the network has its lead connected to ground 19. The microcontroller 1 can ground (or float) the leads of the resistors 13 to 17 to change the total impedance value Za at node 22. The series capacitor 23 blocks any DC voltage so that the amplifier has unity gain for DC voltages.

Figure 4:
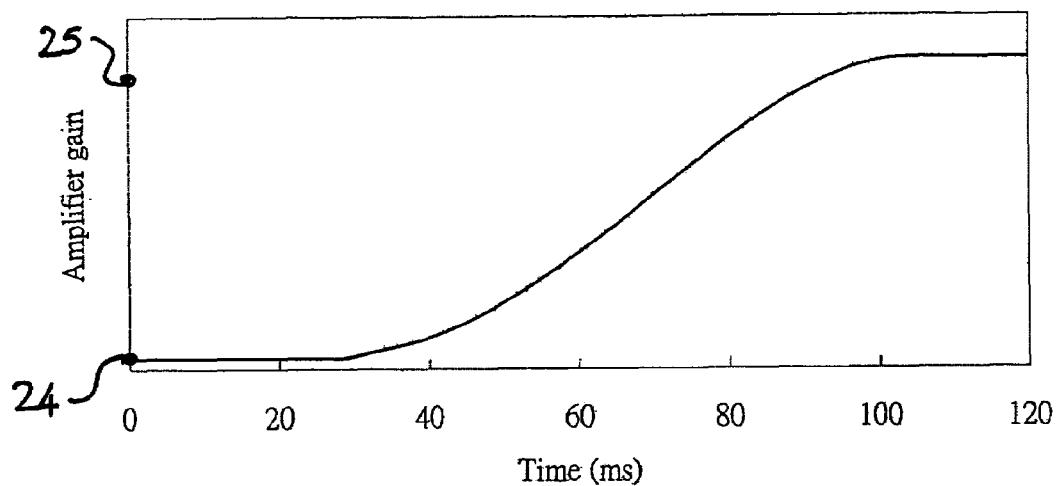
FIG. 4 is a graph of the variation in gain versus time.

FIG. 4 is a graph of the variation of amplifier gain with time. Upon generating the acoustic signal 6 the microcontroller 1 begins to vary the gain of the amplifier 8 with time in accordance with the graph of FIG. 4. The initial gain value 24 for the amplifier 8 is chosen to compensate for intrinsic power losses such as signal conversion losses (from electrical signal to acoustic signal, and vice versa) and loss due to reflection from the object, and is increased towards a final gain value 25 until the reflected signal is detected. Typical values for initial gain 24 and final gain 25 are 100 and 5000 respectively.

The acoustic wave is also attenuated as it passes through the air. Air comprises mainly of nitrogen and oxygen molecules which absorb sound waves. The amount of absorption (attenuation) in the air is related to the vibrational relaxation time of the nitrogen and oxygen molecules. The relevant variables that determine the amount of attenuation are air temperature, static air pressure, relative humidity, frequency of the acoustic wave and distance travelled through the air. The transmission frequency of the acoustic wave is known. Variations in static pressure are generally within plus or minus 5% at altitudes below 1000 feet and the effect of static pressure on sound wave absorption is much less than that of temperature and relative humidity and so can be ignored.

Temperature and humidity sensors 20 are coupled to the microcontroller 1 for providing the microcontroller 1 with air temperature and humidity information. The microcontroller 1 contains a database comprising empirical information relating temperature and relative humidity to corresponding threshold values for the threshold generator 11 to compensate for the effects of temperature and humidity on the attenuation of the acoustic wave.

The following table gives typical values of attenuation in decibels per meter (dB/m) of a 40 kHz sound wave at 1 atmosphere for the specified values of relative humidity (RH) and temperature (Temp) in degrees Celsius.

|  | RH = 30% | RH = 75% | RH = 80% |
| --- | --- | --- | --- |
| Temp = 10 | 0.574 dB/m | — | 1.093 dB/m |
| Temp = 24 | — | 1.2 dB/m | — |
| Temp = 30 | 1.527 dB/m | — | 1.021 dB/m |

Figure 5:
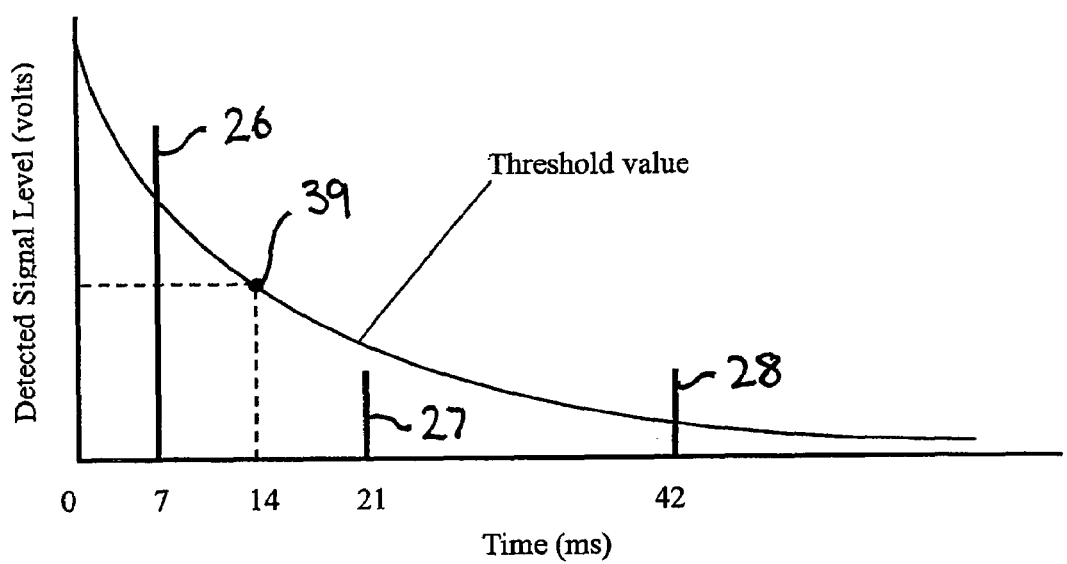
FIG. 5 is a graph of variation in threshold value versus time.

Attenuation of the sound wave is exponential with distance travelled and so to compensate for distance the threshold value is decreased exponentially with time as shown in FIG. 5. The purpose of the comparator 9 is to compare the amplified signal with the threshold value to determine if the received acoustic wave represents a valid reflection for measurement purposes. For example, in FIG. 5 a first signal 26 received after 7 milliseconds is above the threshold value and so is a valid signal, a second signal 27 received after 21 milliseconds is below the threshold value and so is an invalid signal, and a third signal 28 received after 42 milliseconds is above the threshold value and so is also a valid signal.

Figure 6:
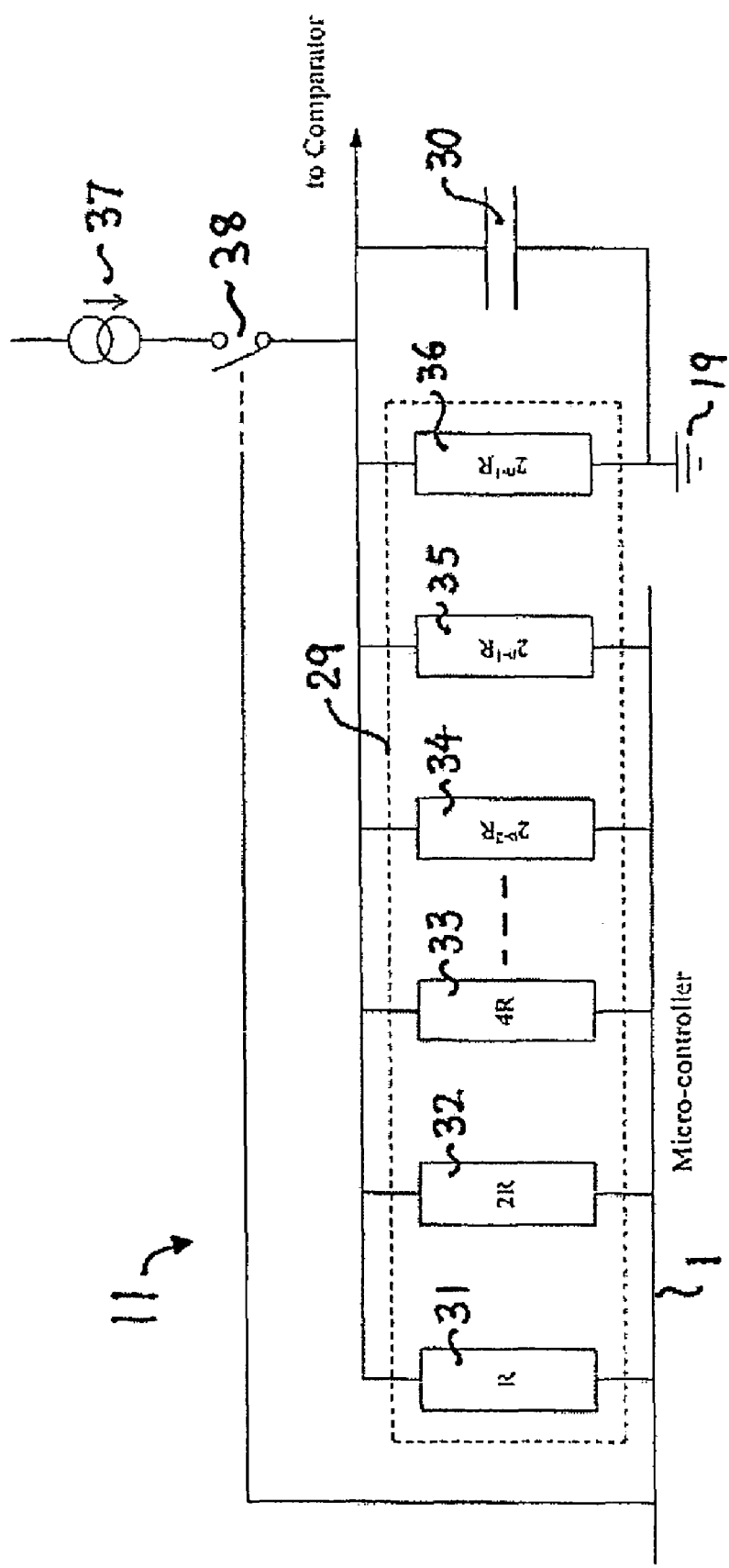
FIG. 6 is the arrangement of the threshold generator 11.

FIG. 6 shows a practical implementation of the threshold generator 11. The threshold generator 11 is an RC circuit comprising a resistor network 29 and a capacitor 30 of capacitance C. The resistor network 29 comprises a plurality of parallel connected resistors 31, 32, 33, 34 and 35 with one lead of each resistor connected to a terminal of the microcontroller 1. One resistor 36 in the network has its lead connected to ground 19. The microcontroller 1 can ground (or float) the leads of the resistors 31 to 35 to change the total resistance value R of the network, and thus the time constant of the RC circuit. A current source 37 charges the capacitor 30 before each discharge cycle of the threshold value. Charging of the capacitor is controlled by the microcontroller 1 via a switch 38. Switch 38 is a transistor, and need not be a physical switch.

Figure 7:
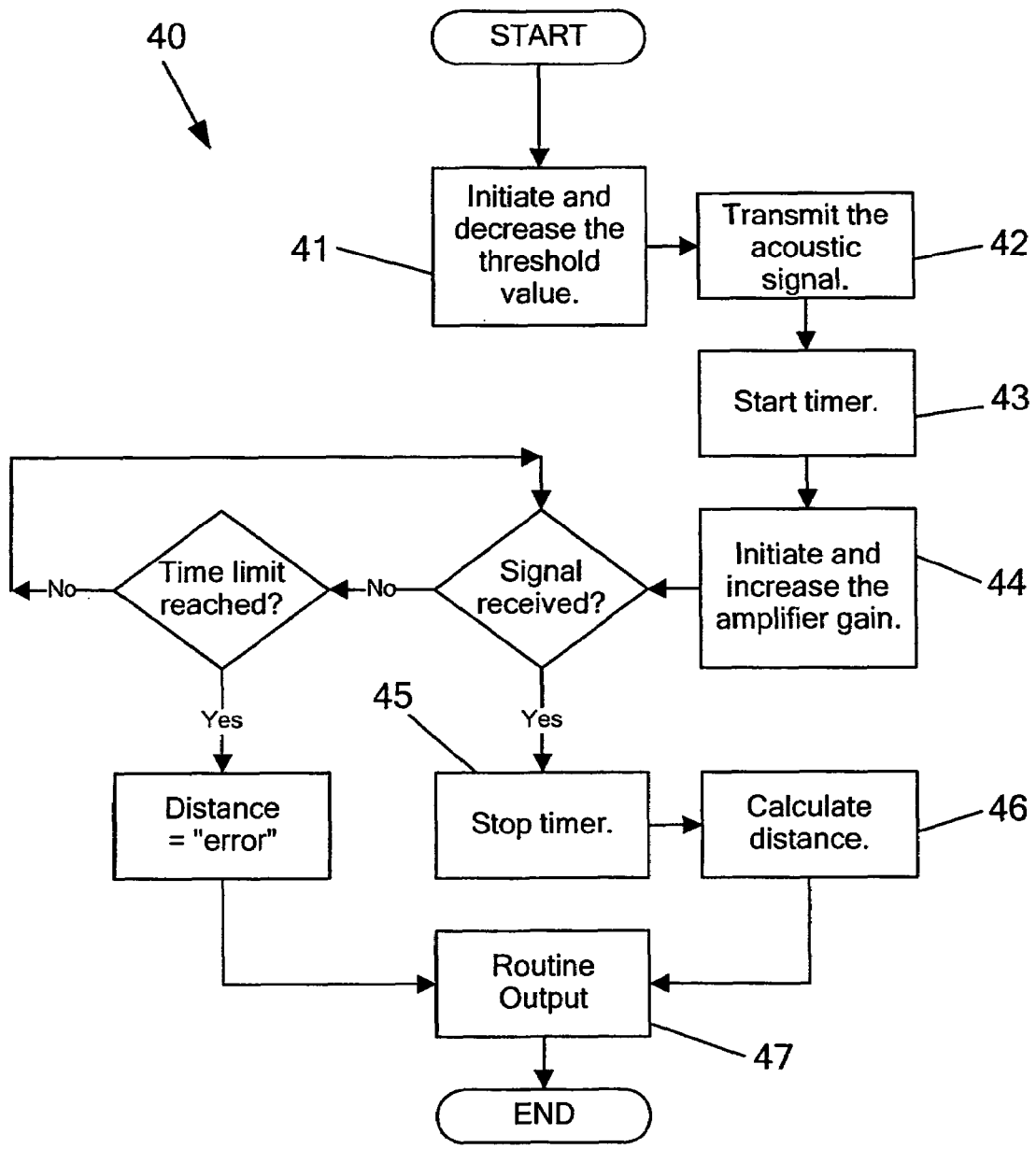
FIG. 7 is a flow chart of the distance measuring routine.

FIG. 7 illustrates the steps of the distance measuring routine 40 of the device. The routine is controlled by microcontroller 1, which, upon entering the routine, sets and initiates the threshold generator, transmits an acoustic signal, starts the timer, and sets and initiates the increase in amplifier gain: steps 41 to 44 respectively. When a valid reflected signal is received the microcontroller 1 stops the timer and calculates the distance: steps 45 and 46. Distance (s) is calculated using the equation s=(v×t)/: where v is the sound velocity and t is the timer elapsed time. The calculated distance is output, step 47, and the distance measuring routine ends.

If a valid reflected signal is not detected within a predetermined time period, say hundred milliseconds, an error message is output and the distance measuring routine ends.

Figure 8:
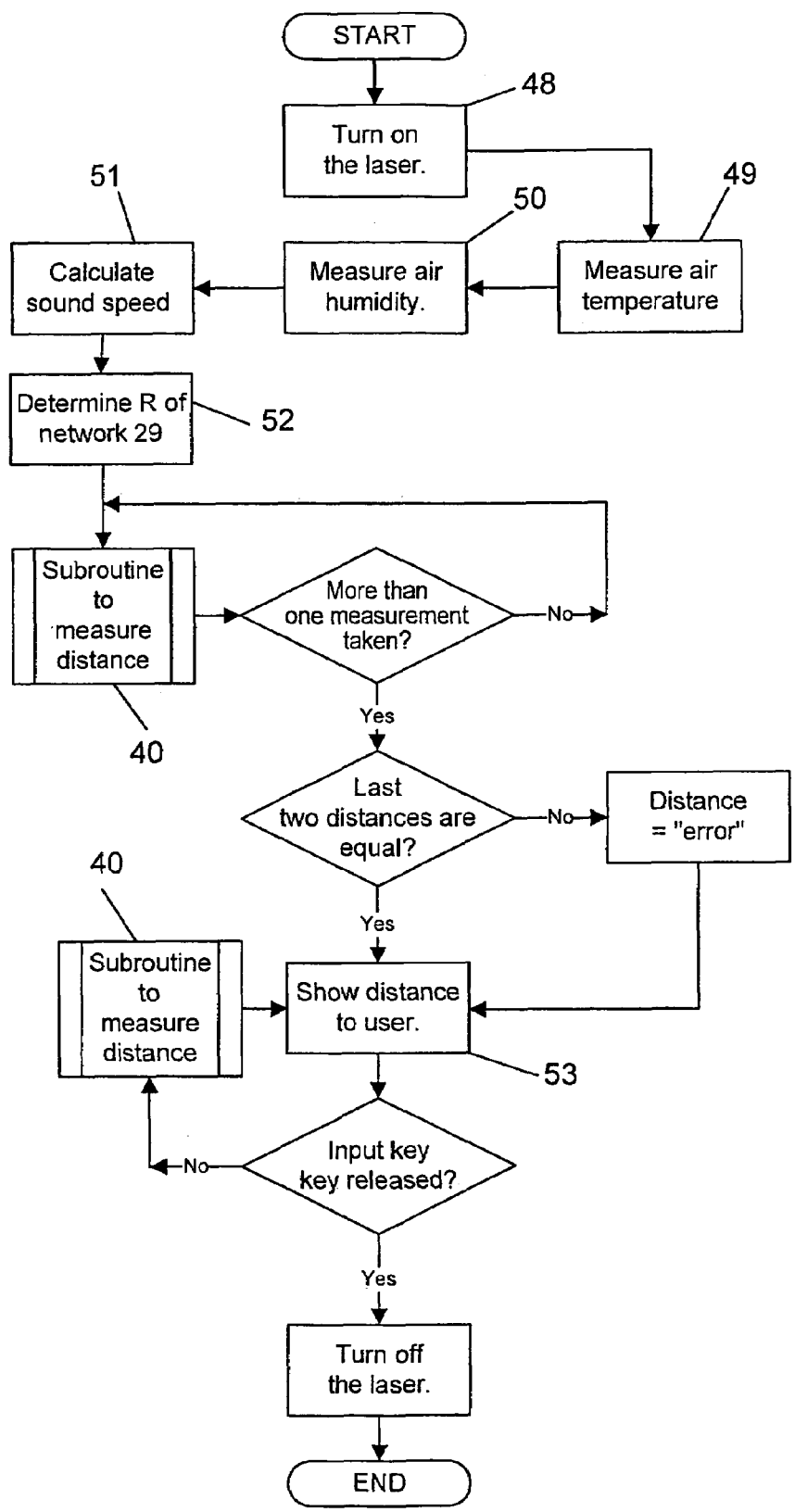
FIG. 8 is a flow chart of the measuring device operating steps.

FIG. 8 shows the method of operation of the device. The operation is controlled by microcontroller 1. The user points the device at an object and presses the key input 21 button to cause the device to measure, acoustically, the distance to the object. The first steps are to turn on the laser pointer, measure air temperature and humidity and calculate the sound velocity v, steps 48 to 51 respectively. The sound velocity is calculated using the equation v=331.45×Sqr((T+273.16)/273.16): where v and T are the sound velocity (m/s) and the air temperature (in degrees Celsius) respectively.

The microprocessor then determines the resistance value R of the resistor network 29 to give the required exponential decay for the threshold value: step 52. For the exponential RC discharge circuit, the half-life t(½), which is the time taken for the voltage to discharge to half of its initial value, is defined by the equation t(½)=ln 2×R×C. The following example calculation is based on an attenuation of, say, 1.2 dB/m from the temp/RH table above.

The first step in calculating R of the resistor network 29 is to determine the distance the acoustic wave must travel for its voltage to be attenuated by 50% using the equation a×2d=10 log(Pi/P): where a is the attenuation in dB/m, d is distance from transducer to target, Pi is the initial power of the transmitted acoustic wave and P is the received power. Parameter P is 25% of Pi as power is proportional to the square of voltage and so a 50% drop in signal voltage corresponds to a 75% drop in power. Substituting in the known values we get 1.2×2d=10 log(4). Solving for d gives a distance from transducer to target of 2.5 meters. The distance the received signal travels from transducer to target to transducer is 5 meters.

The second step is to determine the time it takes for the acoustic wave to travel the 5 meters using the equation s=v×t: where s is the distance travelled, v is the wave velocity and t is the time taken. The speed of sound in air at 24 deg C. is 345.7 m/s and so the time t for the acoustic wave to travel 5 meters from the transducer to the target and back is=14.5 ms. This is t(½).

The third step is to determine the value R required for the threshold value to reduce exponentially to 50% of its initial value after 14.5 ms. This is represented by point 39 in FIG. 5. Taking C=0.1 µF and substituting the other known values in the equation t(½)=ln 2×R×C we get 0.7×R×0.1µ=14.5 m or R=207 kΩ. The microcontroller 1 presets a practical and empirical value of R as 150 kΩ such that valid signals can be detected as shown in FIG. 5.

If the attenuation increases with temperature and relative humidity changes, which are detected by the sensors 20, R will be lowered by the microcontroller to have an exponential discharge with deeper slope and shorter half-life to maintaining valid signal detection. Similarly, if the attenuation decreases with temperature and humidity changes R will be increased.

Once the required value of R has been calculated the microcontroller 1 enters the distance measurement routine 40 of FIG. 7. To ensure accuracy of the measurement the microcontroller 1 makes at least two separate distance measurements back-to-back and only if the two measurements are the same is the distance measurement displayed on the LCD display 12, step 53. If the two measurements are not the same then an error message is displayed on the LCD display 12. The user can be confident of the displayed measurement and need not, as is common practice, take several repeatedly measurements themselves in order to verify the recorded reading.

If the user continues to press (hold) the input key 21 the device will continuously repeat the distance measurement using the routine of FIG. 7 to continuously update the distance measurement reading on the LCD display 12 while the button is held. While the user holds the input key the laser pointer remains on continuously. The user can direct the device at other objects or a moving object to see the changing distance of the object.

It should be appreciate that modifications and alternations obvious to those skilled in the art are not to be considered as beyond the scope of the present invention.

What is claimed is:

1. A distance measuring device comprising:
   an acoustic signal transmitter for transmitting an acoustic signal towards a distant object,
   an acoustic signal receiver for receiving a reflected acoustic signal reflected from the distant object,
   a temperature sensor for detecting air temperature,
   a humidity sensor for detecting air humidity,
   an amplifier coupled to the receiver for amplifying the reflected acoustic signal to produce an amplified reflected acoustic signal,
   a comparator coupled to the amplifier for comparing level of the amplified reflected acoustic signal with a reference level and generating a comparator output when the level of the amplified reflected acoustic signal exceeds the reference level,
   a gain controller for controlling gain of the amplifier and increasing the gain from time of transmitting an acoustic signal towards a distant object until the comparator output is generated,
   a threshold generator for providing the reference level to the comparator based on both the air temperature detected and the air humidity detected and decreasing the reference level at an exponential rate of decrease from the time of transmitting the acoustic signal until the comparator output is generated, and a controller for determining the distance to the distant object using, only the air temperature detected, velocity of the acoustic signal, and the time of transmitting the acoustic signal until the comparator output is generated.

2. The distance measuring device of claim 1 wherein the gain controller comprises a plurality of independently switchable resistors connected in parallel and a capacitor connected in series with the resistors.

3. The distance measuring device of claim 1 wherein the threshold generator comprises a current source, a plurality of independently switchable resistors, and a capacitor connected in parallel with the resistors.

* * * * *